Patented Oct. 9, 1934

1,975,897

UNITED STATES PATENT OFFICE 1,975,897

MANUFACTURE OF CELLULOSE MIXED ESTERS

Max Hagedorn and Paul Möller, Dessau-in-Anhalt, Germany, assignors to I. G. Farbenindustrie Aktiengesellschaft, Frankfort - on - the-Main, Germany No Drawing. Application January 31, 1930, Serial No. 425,054. In Germany February 25, 1929

5 Claims. (Cl. 260—101)

Our present invention relates to a new process of manufacturing cellulose esters containing in their molecule different organic acid radicles, and more particularly to such a process in which the esterification of cellulose with several organic acids is performed in one operation.

According to our invention, readily soluble mixed cellulose esters of organic acids can advantageously be prepared by treating the cellulose with an organic acid or its anhydride and simultaneously with a halide of another organic acid in the presence of a tertiary base the quantity of which is smaller than the total quantity corresponding to the acid and acid derivatives present, so that the esterifying mixture shows always an acid reaction. Thus, for instance, the quantity of base we add, may be equivalent only to the organic acid halide present in the reacting mixture.

The new process has above all the advantage that only one of the acid components need be used in the form of its halide. This is of a great importance for the economy of the process because, as is known, various acid halides are difficulty accessible or can only be prepared in an expensive manner. If two different acid radicles have to be introduced into the cellulose molecule, that acid the halide of which is difficultly accessible or expensive, can be used in the form of the acid itself or of its anhydride together with the acid halide which is more easily accessible, cheaper or can be better regulated in its esterification action. There are suitable for our new process all of the lower and higher saturated and unsaturated, substituted or unsubstituted fatty acids as, for instance, formic acid, acetic acid, propionic acid, butyric acid, caproic acid, lauric acid, palmitic acid, crotonic acid, oleic acid, ricinoleic acid, stearic acid, or cyclic carboxylic acids, such as naphthenic acid, their anhydrides and halides.

In the course of reaction which, if required, may be carried out in the presence of a diluent or a catalyst, an ester of cellulose is formed, which contains in the molecule both the radicle of the acid or the acid anhydride and that of the acid halide.

As a tertiary base we prefer to use pyridine or the technical pyridine bases; with a similar effect we may add, however, to the mixture of acid and acid halide lutidine, collidine, quinoline, triethylamine, care being taken that the esterifying mixture shows always an acid reaction.

Our new process offers the further advantage that in a single working operation readily soluble mixed cellulose esters are formed which are eminently suitable for all purposes cellulose derivatives are generally used for, particulary for the manufacture of films, artificial threads, lacquers, knifing masses, artificial leather, impregnating solutions, electric insulating substances or the like. When preparing mixed esters containing among others radicles of the acetic acid, according to our new process compounds are formed, which are from the very beginning soluble in acetone, so that the after-treatment which in other processes is necessary for obtaining hydrolysis, can be dispensed with.

The following examples illustrate the invention, the parts being by weight:—

Example 1.—5 parts of cellulose are introduced into a mixture of 40 parts of naphthenic acid chloride, 11 parts of glacial acetic acid and 18.5 parts of pyridine and the whole is heated to 120° C. to 125° C. for one hour while well stirring. After cooling, the reaction mass is poured into methanol. Thereby a cellulose acetate naphthenate separates in a flocky form which is purified by repeatedly washing with methanol. After drying, a light granular mass is obtained which is soluble in acetone and halogen hydrocarbons and can be worked up into clear films.

Example 2.—5 parts of cellulose are heated for one hour to 100° C. to 105° C. in a mixture of 40 parts of naphthenic acid chloride, 19 parts of acetic anhydride and 19 parts of pyridine. The reaction mixture is worked up as indicated in Example 1. There is likewise obtained a cellulose acetate naphthenate which is soluble in acetone.

Example 3.—50 parts of cotton are introduced while well stirring into a mixture of 290 parts of acetyl chloride, 160 parts of butyric acid and 185 parts of technical pyridine bases with addition of 350 parts of chlorobenzene and the whole is heated for ¾ to 1 hour to 120° C., stirring being continued until a uniform solution has formed. The reaction mixture is then poured into methanol and a cellulose acetate-butyrate is obtained which is soluble in acetone and can be purified in the usual manner.

Example 4.—2 parts of cotton are introduced into a mixture of 15 parts of pure cocoanut oil acid, 8 parts of butyric acid chloride and 7 parts of technical pyridine bases, the whole is well stirred and heated for one hour to 130° C. while stirring. After cooling, the reaction product is precipitated by means of methanol and purified by washing with methanol. A butyric acid-cocoanut oil acid ester of cellulose is obtained in the form of a slightly yellowish powder which is easily soluble in acetone and halogen hydrocarbons.

What we claim is:—

1. The process which comprises acting upon cellulose with a compound selected from the group consisting of aliphatic acids, cyclic carboxylic acids and of anhydrides of aliphatic acids and cyclic carboxylic acids, and simultaneously with a halide of another acid selected from the above signified group in the presence of a tertiary base in an amount stoichiometrically equivalent to the said acid halide contained in the esterifying mixture.

2. The process which comprises acting upon cellulose with a compound selected from the group consisting of aliphatic acids, cyclic carboxylic acids and of anhydrides of aliphatic acids and cyclic carboxylic acids, and simultaneously with a halide of another acid selected from the above signified group in the presence of pyridine in an amount stoichiometrically equivalent to the said acid halide contained in the esterifying mixture.

3. The process which comprises introducing 5 parts of cellulose into a mixture of 40 parts of naphthenic acid chloride, 11 parts of glacial acetic acid and 18.5 parts of pyridine, heating the mixture to 120–125° C. and separating the formed acetate naphthenate.

4. The process which comprises introducing 50 parts of cotton into a mixture of 290 parts of acetyl chloride, 160 parts of butyric acid and 185 parts of technical pyridine bases with addition of 350 parts of chlorobenzene, heating the mixture to 120° C. and separating the formed cellulose acetate-butyrate.

5. The process which comprises introducing 2 parts of cotton into a mixture of 15 parts of cocoanut oil acid, 8 parts of butyric acid chloride and 7 parts of technical pyridine bases, heating the mixture to 130° C. and separating the formed butyric acid cocoanut oil acid ester of cellulose.

MAX HAGEDORN.
PAUL MÖLLER.